March 19, 1963
H. KAHN
3,082,375
TUNABLE HIGH FREQUENCY RESPONSIVE
DEVICE WITH SHIELDED CONVERTER
Filed July 5, 1960
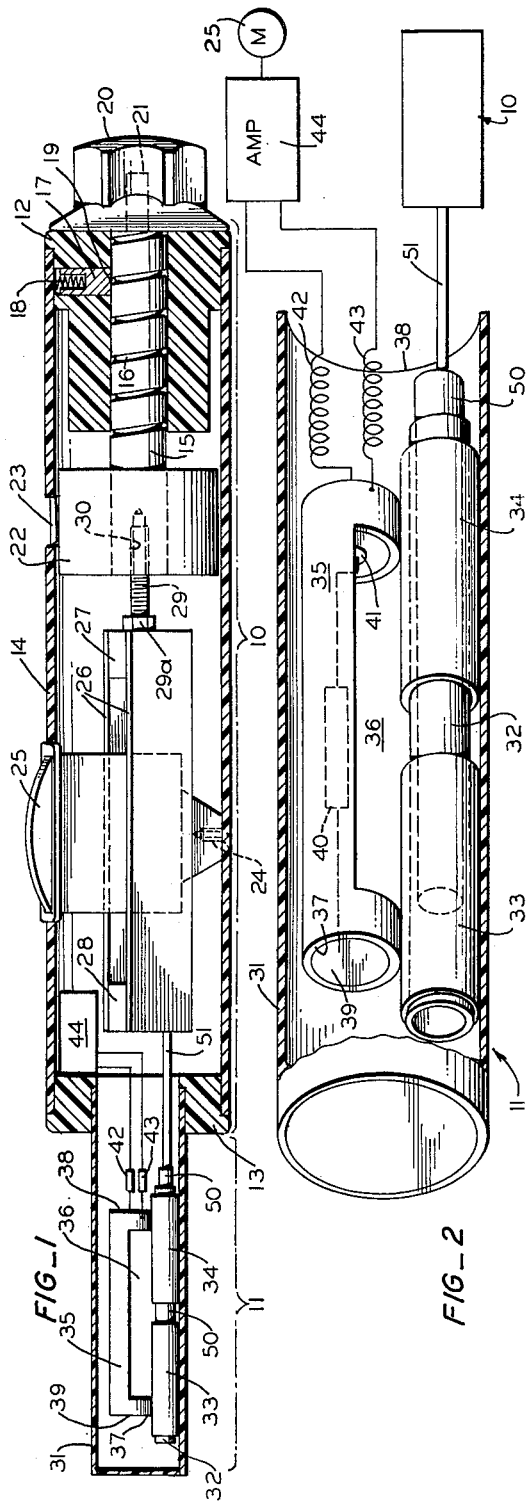
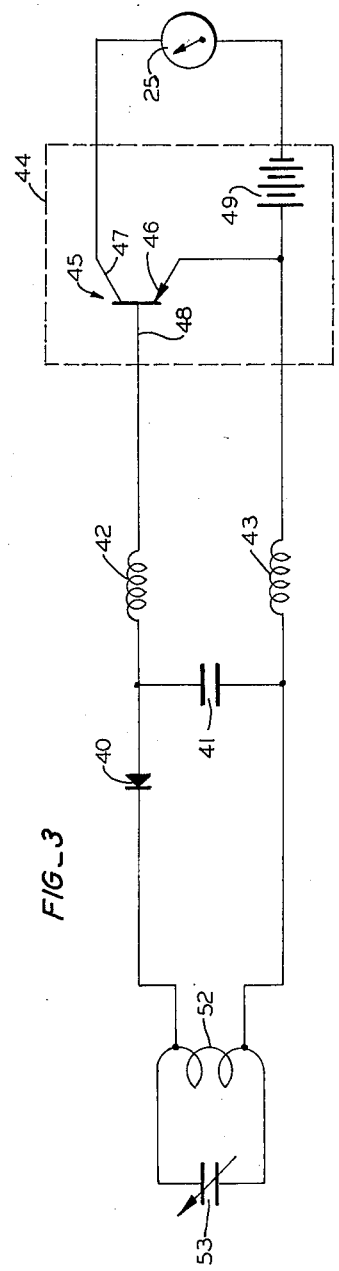
INVENTOR.
*HARRY KAHN*
BY 
ATTORNEY though apertures 14.

United States Patent Office 3,082,375
Patented Mar. 19, 1963

3,082,375
TUNABLE HIGH FREQUENCY RESPONSIVE DEVICE WITH SHIELDED CONVERTER
Harry Kahn, Campbell, Calif., assignor of one-half to I. Robert Mednick
Filed July 5, 1960, Ser. No. 40,657
6 Claims. (Cl. 324—81)

The present invention relates to an ultra high frequency responsive device having a tunable resonant structure which is capable of picking up radiated electrical energy.

An object of this invention is to provide an ultra high frequency measuring device having a resonant structure which is adaptable for use in measuring ultra high frequencies, such as between 100 and 1000 megacycles.

Another object of this invention is to provide a tunable resonant structure that is small in size so that it may be used in confined spaces, and may be incorporated in a measuring device that may be easily carried by hand while performing its measuring function.

Still another object of this invention is to provide an ultra high frequency measuring device having an energy pick up member that substantially surrounds associated radiation sensitive elements used therewith, and effectively shields them so that they will not themselves pick up radiated electrical energy and result in spurious indications.

A further object of this invention is to provide an ultra high frequency measuring device that is inexpensively constructed, yet highly sensitive to radiated electrical energy.

A still further object of this invention is to provide a resonant structure for an ultra high frequency measuring device that is accurately and reliably tunable to the frequency of the radiated energy.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIG. 1 is a view showing an ultra high frequency measuring device of this invention in which the outer casings are in cross-section to illustrate the interior of this device.

FIG. 2 is an enlarged perspective view of the tunable resonant structure of the measuring device seen in FIG. 1.

FIG. 3 is a schematic drawing showing the electrical symbol equivalent of the electrical circuit of the device shown in FIG. 1.

Referring to the drawings, FIG. 1 generally indicates the movable means portion by numeral 10, and the tunable resonant structure portion by numeral 11. The movable means portion includes a first end collar 12, a second end collar 13, and a hollow cylindrical casing 14 secured at each end to said end collars respectively. A tuning shaft 15 with a helical groove 16 at one end is movable within a center bore in first end collar 12. A shaft guide 17 has a spring 18 in a recess at one end to press its other end 19 to ride in helical groove 16 and to guide tuning shaft 15. Knob 20 is secured to shaft 21 extending from tuning shaft 15 in order to rotate tuning shaft 15 to move it in the direction of the bore of first end collar 12 while guided by shaft guide 17 in helical groove 16. Fixedly secured on the other end of shaft guide 15 is a dial collar 22 which rotates with shaft guide 15 and has dial indications on its surface which can be seen through aperture 23 in cylindrical casing 14.

A screw 24 secures direct current meter 25 which extends through an aperture in casing 14. On both flat sides of meter 25 are a pair of plastic plates 26 connected at their ends by blocks 27 and 28. Screw 29 has one end threaded in block 27 and is fixed in position by nut 29a, the other end of screw 29 fits within a threaded hole 30 in tuning shaft 15.

In tunable resonant structure portion 10, cylindrical casing 31 has its open end extending within central opening of second end collar 13 and is connected thereto by glue or the like. Within cylindrical casing 31 is a glass tube 32 which supports a first hollow cylindrical conducting member 33 and a second hollow cylindrical conducting member 34 which are also connected to casing 31 by glue or the like. Curved plate 35 may be formed by cutting out a longitudinal portion 36 from a hollow brass cylinder and has its ends 37 and 38 soldered to first and second hollow conducting members respectively. A brass slug 39 closes end 37 of plate 35, and provides a soldering surface to which detector 40, such as germanium or silicon diode allowing electrical energy to only pass in one direction is connected. A feed through capacitor 41 secured in end 38 connects detector 40 to first coil or choke 42 which in turn connects to amplifier 44. Second coil or choke 43 electrically connects second cylindrical member 34 and end 38 to amplifier 44. Meter 25 connects across the output of said amplifier 44. A third brass cylindrical member 50, of brass or the like, is seen to be a solid cylinder although it may be hollow. Said cylindrical member 50 connects to move with block 28 by means of plastic rod 51. First and second cylindrical members 33 and 34, and plate 35 are preferably made of brass or copper for rigidity and coated with silver for low electrical resistance loss at ultra high frequencies. Casing 31, plastic rod 51, and tube 32 in tunable resonant structure portion 10, as well as casing 14, collars 12, 13, and 22, plates 26, and blocks 27 and 28 are made of nonconducting material which present low energy loss and absorption at ultra high frequencies.

Referring now particularly to FIG. 2, it is seen that the ultra high frequency energy pick up member includes plate 35 together with hollow cylindrical members 33 and 34 which mechanically present a substantially enclosed structure to radiated electrical energy and essentially prevent interior components from picking up ultra high frequency energy. In addition the energy pick up member almost forms an essentially complete inductive turn of electrically conducting material which is represented symbolically in FIG. 3 as inductance 52. Within hollow conducting members 33 and 34, cylindrical member 51 may be moved along the longitudinal axis of glass cylinder 32 to vary the electrical capacitance between members 33 and 34 and thus forming a variable capacitance which is represented symbolically in FIG. 3 as variable capacitance 53. The tunable resonant structure comprises plate 35 and cylinders 33, 34, and 50. It is to be noted that hollow conducting members 33 and 34 are at the same time part of the inductive as well as part of the capacitive electrical elements of the tunable resonant structure.

In operation, the ultra high frequency measuring device of FIG. 1 is positioned so that tunable resonant structure portion is closest to the radiated electrical energy source. End 19 of shaft guide 17 in helical groove 16 will cause shaft 15 to move either in or out of center bore or central opening of collar 12 by rotating knob 20. The yoke formed by plates 26 and blocks 27 and 28 cannot rotate, but screw 29 in threaded hole 30 allows the yoke to follow the lateral movement of shaft 15. Cylinder 50 connected to block 28 by rod 51 will follow the movement of the yoke. Knob 20 will be rotated until cylinder 50 will be positioned so that the tunable resonant structure is resonant to the radiated energy which will be indicated by the reading of meter 25. As seen in FIG. 3, the ultra high frequency energy picked up by the equivalent tuned circuit 52 and 53 will be rectified by detector 40. Capacitor 41 will smooth out the rectified variations of the detected signal. Chokes 42 and 43 further prevent any rectified variations of the detected signal from being applied to direct current amplifier 44 and only allows an equivalent direct current signal to pass. The direct current signal is applied across base 28 and emitter 46 of transistor 45; collector 47 of transistor 45 connects to meter 25 which connects to emitter 46 of transistor 45 through battery 49. The frequency of the radiated electrical energy detected by the ultra high frequency measuring device of this invention will be determined by the dial indications on the surface of dial collar 22 as seen through aperture 23.

In measuring ultra high frequency signals, such as between 100 and 1,000 megacycles, or any large portion of such range, it is desirable to eliminate so-called spurious readings. Spurious readings occur when exposed wires or other elements become the pick up points for the radiated energy which may either partially cancel out the energy picked up by the intended energy pick up member, or introduce energy by another path which provides another tuned circuit arrangement since the inductive, capacitive, and resistive characteristics are effectively differently arranged. These spurious readings cause the measuring device to be unreliable for large ranges of frequencies. The present invention provides an ultra high frequency measuring device having a tunable resonant structure including a straight elongated conducting plate and two hollow conducting members for the energy pick up member, the hollow members also being part of the variable capacitive element of the effective resonant electrical circuit. It is to be noted that plate 35 is a straight elongated conducting member which is parallel to the axis of coaxial conducting cylinders 33 and 34. Plate 35 is shown to be shaped (i.e. curved in the illustrations shown) traverse its elongated dimension to shield detector 40 and its wire connectors to prevent them from picking up ultra high frequency energy. The straight elongated plate 35 provides a sensitive large radiation pick up surface which together with the conducting cylinders 33 and 34 result in a tunable resonant structure that has a substantially high and constant Q over a large range of ultra high frequencies. This resonant tunable structure has proven in practice to only allow negligible energy to be picked up by elements other than the intended energy pick up member, and thereby prevent spurious readings.

Although the invention is shown by a preferred embodiment illustrated in the drawings and explained in this specification, variations without departing from the invention may be possible. It is understood, therefore, that the invention is limited only by the claims as interpreted in view of the prior art.

What is claimed as new is:

1. An ultra high frequency measuring device comprising: an energy pick up member including a first hollow cylindrical conducting member, a second hollow cylindrical conducting member axially aligned with said first cylindrical member, and a conducting plate having its opposite ends connected to said first and second cylindrical members respectively, said energy pick up member forming an inductance to pick up radiated ultra high frequency energy to be measured; a third cylindrical conducting member; tunable means to selectively move said third cylindrical member within and along the axis of said first and second cylindrical members of the energy pick up member to vary the electrical capacitance therebetween; a converter connected to said opposite ends of said conducting plate and positioned between the plate and said first and second cylindrical members to convert ultra high frequency signals to equivalent direct current signals; and a direct current signal indicating means connected to said converter.

2. An ultra high frequency measuring device comprising: a tunable resonant structure including a first hollow cylindrical conducting member, a second hollow cylindrical conducting member spaced from and axially aligned with said first cylindrical member, a conducting plate having its opposite ends connected to said first and second cylindrical members respectively, said plate being curved to partially enclose the space between the plate and the first and second cylindrical members, said conducting plate together with said first and second cylindrical members forming an inductance to pick up radiated ultra high frequency energy to be measured, a third cylindrical conducting member, and tunable means to selectively move said third cylindrical member within and along the axis of said first and second cylindrical members to vary the electrical capacitance therebetween; a converter connected between the plate and said first and second cylindrical members to convert ultra high frequency signals to equivalent direct current signals; and a direct current signal indicating means connected to said converter.

3. An ultra high frequency measuring device comprising: a tunable resonant structure including an energy pick up member having a first hollow cylindrical conducting member, a second hollow cylindrical conducting member axially aligned with said first cylindrical member, and a conducting plate having its opposite ends connected to said first and second cylindrical members respectively, said plate being shaped to partially enclose the space between the plate and the first and second cylindrical members, said energy pick up member forming an inductance to pick up radiated ultra high frequency energy to be measured, a third cylindrical conducting member, and tunable means to selectively move said third cylindrical member within and along the axis of said first and second cylindrical members to vary the electrical capacitance therebetween; a direct current converter positioned within the energy pick up member and connected to the tuning structure to convert ultra high frequency signals to equivalent direct current signals; a direct current amplifier connected to the converter; and a direct current signal indicating means connected to said amplifier.

4. The device in accordance with claim 3 wherein said direct current converter includes a detector to allow electrical energy to pass in one direction, said detector having one end connected to one end of said plate, and a feed through capacitor connected in series with the detector and secured to the other end of said plate.

5. An ultra high frequency measuring device comprising: a tunable resonant structure including an energy pick up member having a first hollow conducting member, a second hollow conducting member axially aligned with said first hollow member, and a straight elongated conducting plate having its opposite ends connected to said first and second hollow members respectively, said plate being shaped traverse its elongated dimension to partially enclose the space between the plate and the first and second hollow members, said energy pick up member forming an inductance to pick up radiated ultra high frequency energy to be measured, a third conducting member, and tunable means to selectively move said third member within said first and second hollow members to vary the electrical capacitance therebetween; a direct current converter positioned in the energy pick up member and connected to the tuning structure to convert ultra high frequency signals to equivalent direct signals; a direct current amplifier connected to the converter; and a direct current signal indicating means connected to said amplifier.

6. An ultra high frequency responsive device comprising: an energy pick up member including a first hollow cylindrical conducting member, a second hollow cylindrical conducting member axially aligned with said first cylindrical member, and a connecting member having its opposite ends connected to said first and second cylindrical members respectively, said energy pick up member forming an inductance to pick up radiated ultra high frequency energy, a third cylindrical conducting member within and along the axis of said first and second cylindrical members of the energy pick up member to vary the electrical capacitance therebetween; a converter connected to said opposite ends of said connecting conducting member and positioned between the connecting conducting member and said first and second cylindrical members to convert ultra high frequency signals to equivalent direct current signals; and a direct current signal responsive means connected to said converter.

References Cited in the file of this patent

UNITED STATES PATENTS

| | | |
|---|---|---|
| 2,276,743 | Shimizer et al. | Mar. 17, 1942 |
| 2,284,379 | Dow | May 26, 1942 |
| 2,548,598 | Feiker | Apr. 10, 1951 |
| 2,574,637 | Gardiner et al. | Apr. 3, 1951 |
| 2,594,895 | Feiker | Apr. 29, 1952 |
| 2,849,691 | De Tar | Aug. 26, 1958 |

OTHER REFERENCES

"Measuring Decimetric Wavelengths," article in Wireless World, July 1958, pp. 319–322.